A. C. TENNEY.
TIRE INFLATING MEANS.
APPLICATION FILED FEB. 26, 1917.
1,330,560.
Patented Feb. 10, 1920.
3 SHEETS—SHEET 1.
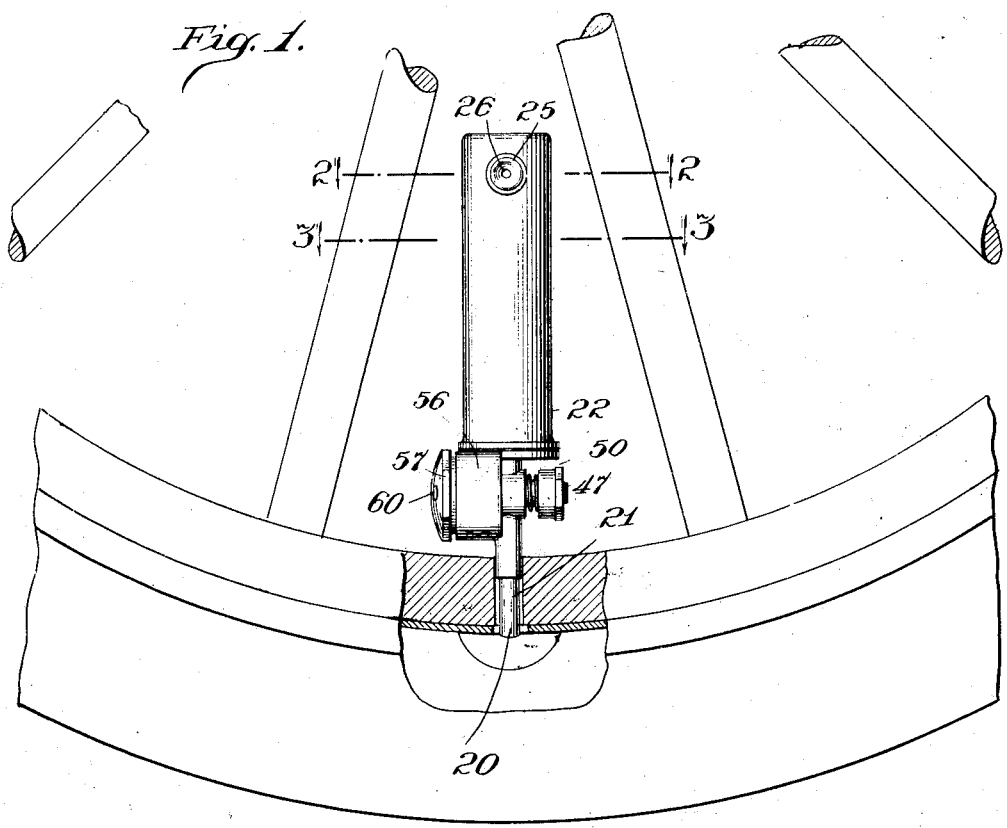
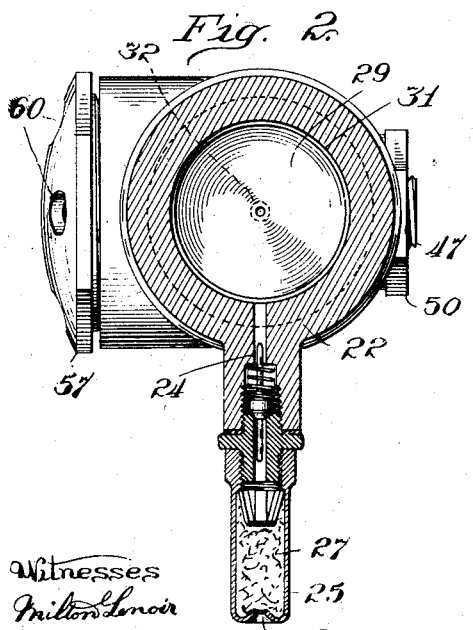
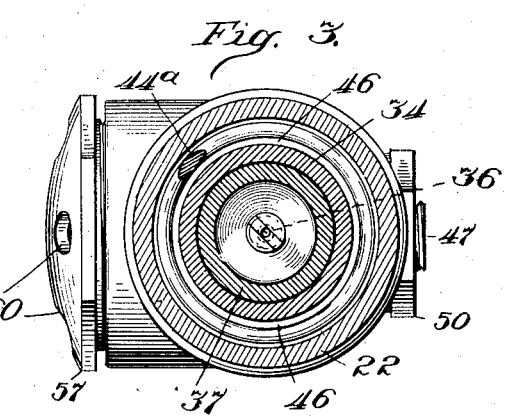
Witnesses
Milton Lenoir
F. A. Howell
Inventor
Alonzo C. Tenney,
By Ferdman Street
Attorneys A. C. TENNEY.
TIRE INFLATING MEANS.
APPLICATION FILED FEB. 26, 1917.
1,330,560.
Patented Feb. 10, 1920.
3 SHEETS—SHEET 2.
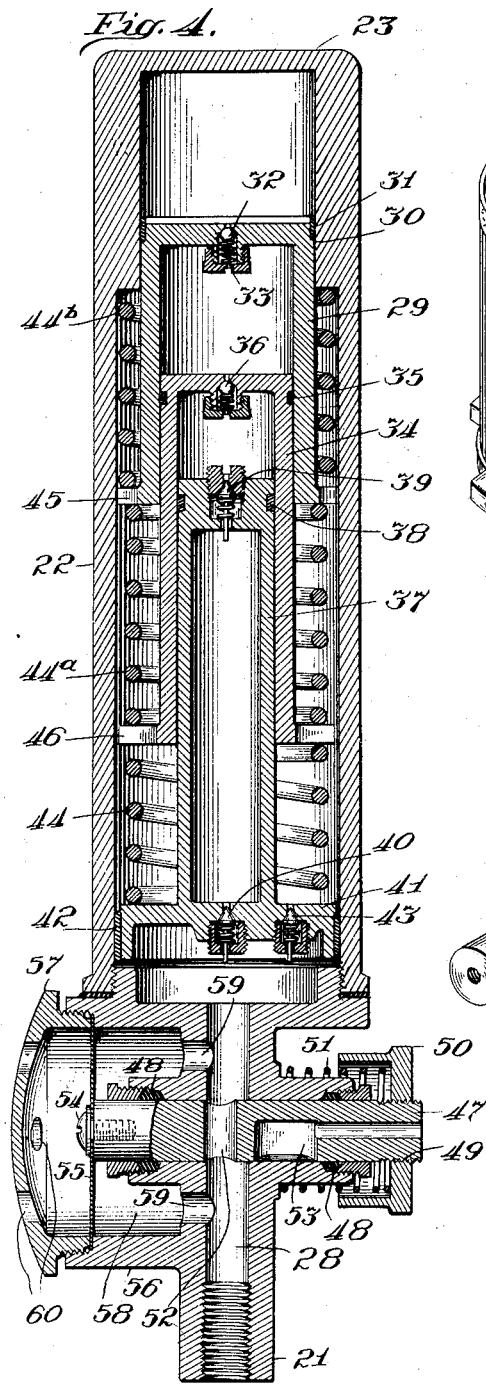
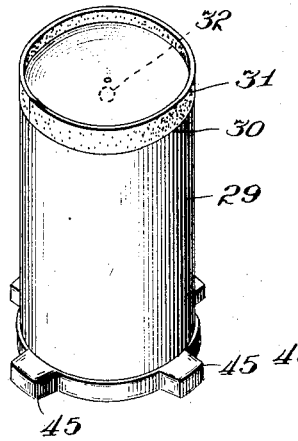
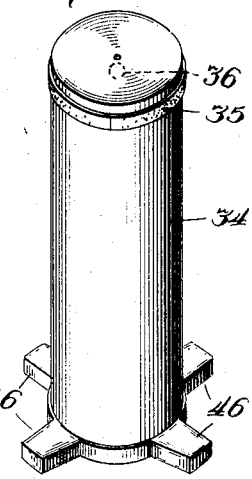
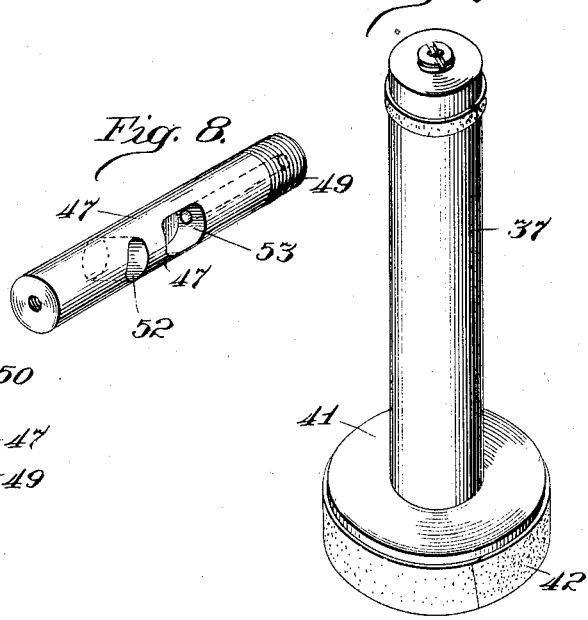

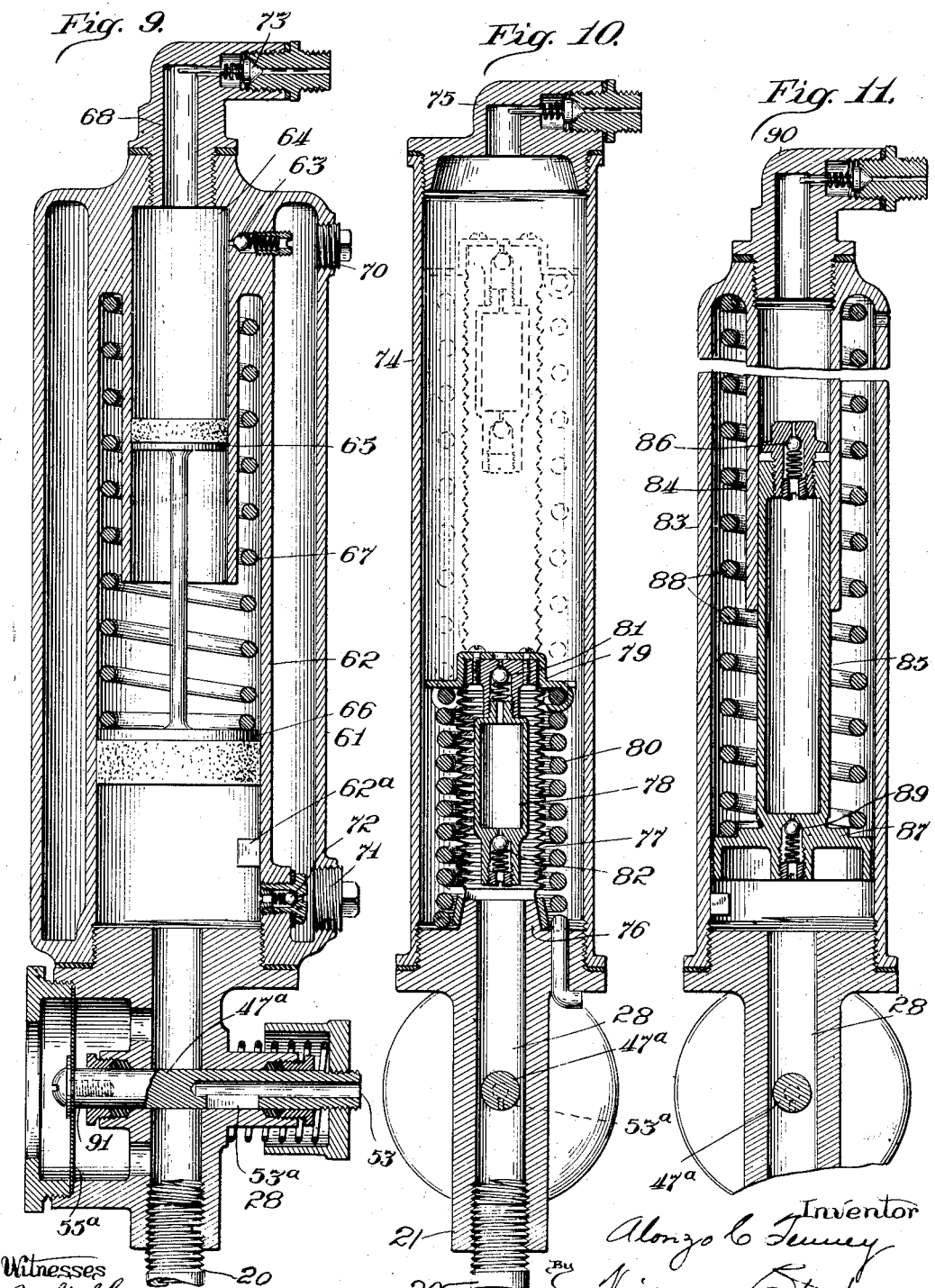

UNITED STATES PATENT OFFICE.

ALONZO C. TENNEY, OF CHICAGO, ILLINOIS.

TIRE-INFLATING MEANS.

1,330,560. Specification of Letters Patent. Patented Feb. 10, 1920.

Application filed February 26, 1917. Serial No. 151,051.

*To all whom it may concern:*

Be it known that I, ALONZO C. TENNEY, a citizen of the United States, and a resident of Chicago, in the county of Cook and State of Illinois, have invented certain new and useful Improvements in Tire-Inflating Means, of which the following is a description, reference being had to the accompanying drawings, which form a part of my specification.

My invention relates to means whereby the inflation of tires for automobiles and the like will be automatically maintained; the invention having for its object the provision of means adapted to utilize, and be made operable by, the intensification or increased pressure resulting from impacts or blows to which the tire is subjected during the travel of the automobile or vehicle. The invention has for its object the provision of means whereby a substantially constant and even pressure or supply of air can be maintained in the tire and the loss of air or pressure through small leakage automatically taken care of.

The purposes and advantages of my invention will be more readily comprehended from the following detailed description of the accompanying drawings, wherein:—

Figure 1 is a side elevation of a portion or sector of a wheel having a pneumatic tire and provided with one form of my invention; a portion of the rim or felly being shown in section at the inlet tube.

Fig. 2 is a cross sectional view, taken on the line 2—2 of Fig. 1 looking in the direction of the arrows.

Fig. 3 is a cross sectional view taken on the line 3—3 of Fig. 1 looking in the direction of the arrows.

Fig. 4 is a longitudinal sectional view of my improved means shown in Fig. 1.

Fig. 5 is a detail perspective view of the movable member or cylinder shown at the upper end of Fig. 4 within the outer shell or casing.

Fig. 6 is a detail view in perspective of the second or intermediate plunger or cylinder shown in Fig. 4 within the outer shell or casing and which telescopes with the cylinder shown in Fig. 5.

Fig. 7 is a detail view in perspective of the plunger or cylinder shown at the lower end of the outer shell or casing in Fig. 4 and which telescopes with the cylinder shown in Fig. 6.

Fig. 8 is detail perspective view of the pressure or pneumostatically controlled valve shown at the lower end in Fig. 4.

Fig. 9 is a longitudinal sectional view of a modified form of my invention; with the storage chamber made concentric with the compression cylinder.

Fig. 10 is a longitudinal sectional view of another modified form wherein an extensible bag or member is employed for the displacement of air and causing compression in the main shell or casing.

Fig. 11 is a similar view of still another modified form of my invention, provided with a hollow piston or storage plunger.

My invention is more especially intended for use in connection with the pneumatic tires of an automobile; and in the particular exemplification disclosed in the drawings is mounted on the felly of the wheel and in communication with the air-receiving tube or casing of the tire through the inlet stem 20, onto which it may be screwed by means of stem 21 or made integral therewith, so as to be disposed radially between the spokes of the wheel as shown in Fig. 1. The length and size of the device are controlled by and made commensurate with the purposes or uses for which it is intended, and if desired may extend to the hub of the wheel and be secured thereto in any suitable manner so as to maintain the proper relation and position of the device.

In the particular disclosure made in the first figures of the drawings, it comprises an outer or main metallic shell 22, preferably cylindrical in form and provided with the end wall 23. This end of the shell or casing, is provided with a suitable valve-controlled inlet, shown at 24 in Figs. 1 and 2; the valve being of a well known spring-controlled type as, illustrated in Fig. 2, so as to be normally maintained on its seat through the action of a suitable spring as long as the atmospheric pressure on the external end of the valve is not in excess of the pressure of its spring and the pressure within the shell or casing 22. The valve is provided with a cap 25, removably screwed thereon; the cap being provided with an air-opening 26 which permits communication with the atmosphere being effected under certain conditions. The cap 25 is preferably provided with some filtering element, as at 27, in order to prevent dust and other extraneous matter passing through the valve.

The opposite end of outer shell or casing 22 terminates in the stem-portion 21 which is provided with a passage 28, see Fig. 4, through which communication with inlet stem 20 of the tire casing is established.

The outer shell or casing 22 is provided with a hollow plunger or cylinder 29 at the upper end of the casing, as shown in Fig. 4; the plunger 29 being provided with an annular shoulder 30 at one end thereof, formed to receive a suitable gland or packing as at 31, so as to effect an air-tight sliding connection with the inner wall of the outer shell or casing 22. This end of the cylinder or plunger 29 is closed and provided with a spring-controlled ball or other suitable valve indicated at 32 mounted in a suitable valve-housing which may be screwed into the wall of the plunger; the valve 32 being maintained on its seat by the spring 33 against outward passage of air from the cylinder or plunger 29. The opposite end of the plunger 29 is open to receive a second hollow plunger or cylinder 34 formed to provide an air-tight sliding connection with the inner walls of plunger 29, by means of a suitable gland 35. The inner end of the plunger 34 is provided with a suitable spring-controlled valve 36, designed to prevent passage from plunger 34 into plunger 29. The plunger 34, in turn, receives a third hollow plunger or cylinder 37 arranged to have air-tight sliding connection with the inner walls of plunger 34 by means of a suitable gland, as at 38. The inner end of plunger 37 is also provided with a suitable spring-controlled valve, here shown in the nature of a needle valve 39 held on its seat against the egress of air from plunger 37. The plunger 37 is also closed at its opposite end, and there provided with a spring-controlled needle, or other suitable type of valve 40, maintained on its seat against the ingress of air into plunger 37. This end of the plunger 37 is also provided with an annular flange 41 of a diameter commensurate with the inner diameter of outer shell or casing 22 so as to permit a substantially air-tight sliding connection to be effected between the flange 41 and the inner wall of outer shell or casing 22; said connection being obtained in any suitable manner as, for example, by the gland 42. In order that communication may be established to opposite sides of flange 41, I provide a suitable spring-controlled valve 43, held to its seat against the passage of air from the tire-side of the flange 41 to the space in outer shell 22 intermediate of shoulder 30 of plunger 29 and flange 41 of plunger 37, see Fig. 4.

Placed within the outer shell or casing 22 are preferably a number of suitable expansion springs 44, 44$^a$, 44$^b$ normally adapted to maintain their respective plungers in the distended relation illustrated in Fig. 4, and assist in restoring the plungers to such position. The open ends of plungers 29 and 34 are provided with radially disposed lugs 45 and 46, respectively, whereby proper alinement of the plungers with the outer shell or casing is maintained, and seats for the ends of the respective spring-sections provided; for example, spring 44$^b$ bears on the off-set in the wall of the casing or shell 22 and on the lugs 45 of plunger 29; spring 44$^a$ bears on lugs 45 of plunger 29 and lugs 46 of plunger 34; while spring 44 bears against lugs 46 of plunger 34 and flange 41 of plunger 37. The springs are all in the nature of expansion springs as previously stated, and also transmit pressure or movement from one plunger to the other.

The stem 21 of the shell or casing 22 is enlarged at a point intermediate of its ends so as to provide suitable bearing or seat for a tubular slide valve 47, shown in detail in Fig. 8; the valve 47 being surrounded with suitable bushings as at 48, 48, whereby air-tight connections may be effected. One end of the valve 47 is shown threaded as at 49 to receive a cap-nut 50 within which is mounted a spring 51, one end whereof bears against the stem-portion 21 and thereby exerts pressure against nut 50 which, in turn, transmits it to slide-valve 47 so as to normally maintain the latter in the position shown in Fig. 4, where the port 52, which extends diametrically through valve 47, will be in communication with the passage 28 in stem 21 and thereby effect communication between the tire, or air-holding casing of the tire, and the lower end of outer shell or casing 22. The valve 47 is also provided with a right angular port 53, one portion whereof is disposed radially, while the other portion extends longitudinally of the valve 47 to the exterior thereof.

The opposite end of valve 47 has secured to it, in any suitable manner, as for example by screw 54, a thin metallic diaphragm 55 which rests on shoulders formed on an annular extension 56 of stem 21, and is held in place by a cap-member 57, which is shown screwed into the extension 56. The extension or hub-portion 56 is of such dimensions as to provide a chamber 58, one side whereof is closed by the diaphragm 55, while the opposite wall, formed by stem 21, is provided with suitable ports, as shown at 59, in Fig. 4, whereby communication between chamber 58 and passage 28 is established. The cap or cover-member 57 is formed so as to provide sufficient space between it and the diaphragm 55 in order to permit flexing of the latter by excessive pressure that may be exerted within chamber 58. The cap-member 57 is provided with openings 60 to permit air displacement intermediate of the diaphragm and the cover when the diaphragm is forced toward the cover.

The purpose and operation of my improved device, as disclosed in the figures just described, is as follows. The tire is initially inflated to the desired degree of pressure by means of a pump, or other suitable device, connected with the stem of inlet valve 24. The air entering outer cylinder or casing 22 will fill the adjacent end of the casing and be compressed therein until the pressure overcomes the tension or resistance of spring-valve 32, thereby permitting air to enter plunger 29 until the pressure therein overcomes the pressure of valve 36 and flows into plunger 34, overcoming the pressure of valve 39 and flows into plunger 37 until it overcomes the action of the spring of valve 40 and flows into passage 28 of tube 21 and through the inlet tube 20 into the tire. As the tire is subjected to sudden impacts or blows, the air within the tire casing will be displaced, and by reason of passage 28 will increase the pressure on the annular flange 41 of plunger 37. If this pressure on flange 41 is in excess of the pressure exerted by the spring 44, it will cause plunger 37 to move lengthwise of plunger 34, and therefore toward the closed end thereof, thereby compressing the air confined within the upper end of plunger 34. The compressing of air in plunger 34 will upset the pneumostatic equilibrium normally existing in plungers 34 and 37; and if the disturbance is such that the air pressure in the upper end of plunger 34 is sufficient to overcome the pressure of spring controlled valve 39, it is evident that the valve 39 will be forced off its seat and air permitted to flow from plunger 34 into plunger 37 until the pressure per unit area within both plungers is equal and a pneumostatic equilibrium restored while the plungers are in such intimate or contracted relation when valve 39 will again be forced to its seat and flow of air from plunger 37 back to plunger 34, during the return of plunger 37 to normal position thereby prevented. The longitudinal movement of plunger 37 will, of course, cause plunger 34 to move longitudinally, both through the action of spring 44 and because of the air compression within the upper end of plunger 34; such movement of plunger 34 will cause compression of spring-section 44ª and, in turn, move plunger 29 lengthwise of outer shell or casing 22; this movement being also induced by the compression taking place within the upper end of plunger 29. Movement of plunger 34 toward the closed end of plunger 29 will compress the air in plunger 29 until the pressure per unit area is greater than that in plunger 34 and the pressure of spring-valve 36, when valve 36 will be moved off its seat and air permitted to flow from plunger 29 into plunger 34 until the pneumostatic equilibrium in both plungers is restored while the plungers are in such intimate or contracted relation. The plunger 29, moving lengthwise of outer shell or casing 22 will compress the air in the upper or closed end of the outer shell or cylinder 22 until the pressure exceeds that exerted by the spring of valve 32 as well as the per unit area pressure within plunger 29, when the valve 32 will be forced off its seat and a portion of the compressed air within the upper end of outer shell or cylinder 22 allowed to flow into plunger 29, until the pressure per unit area within the upper end of outer shell or cylinder 22 and plunger 29 is substantially equal. It is evident from the operation just described that the air-pressures within plungers 29, 34 and 37 have thus been increased beyond the original pressures, and as these reciprocating operations just described are continued, the pressures within the respective plungers will eventually increase to such extent, that the pressure within plunger 37 may exceed the pressure on the tire communicating side of annular flange 41, in which event valve 40 will be forced off its seat against the action of its spring and air within plunger 37 be discharged into the end of outer shell or casing 22 which is provided with passage 28 communicating with the tire casing, thereby providing the tire with an additional supply of air until the pressures per unit area within plunger 37 and the tire are substantially equal. Any increase in air pressure that may occur intermediate of annular shoulder 30 of plunger 29 and flange 41 of plunger 37 will be taken care of by valve 43, when such pressure is in excess of the pressure exerted by the spring of valve 43 and the pressure on the tire side of flange 41.

It is evident from the construction shown and described that as the respective plungers are returned to normal positions through the actions of spring sections 44, 44ª and 44ᵇ, the pneumostatic equilibrium in the respective portions of the device will be disturbed; and such disturbance or reduction, for example in the closed end of outer shell or casing 22, whereby the pressure in shell 22 falls below atmospheric pressure, will cause valve 24 to be forced off its seat against the action of its spring and permit air to flow into the upper end of shell 22 until the pressure per unit area on both sides of valve 24 is substantially equal.

As the longitudinal movements of the respective plungers are repeated by subsequent impulses resulting from the displacement of the air in the tire through blows or impacts, the air supply within the device, as well as the tire, will be correspondingly renewed so that the tire will be constantly inflated under normal conditions and the pressure therein maintained, thereby compensating for any slow leakage from the tire; the construction at the same time taking care of any excess pressure in the tire due to severe jolts or blows and thus obviating the possibility of blow-outs in the tire.

In order to prevent the pressure within the tire increasing beyond the point of safety, through the repeated operations of my improved device, I provide the pneumostatically controlled valve 47, operated by the diaphragm 55, in chamber 58. As is evident from this construction, as the pressure in the tire and adjacent end of the device exceeds the predetermined and regulable pressure exerted by spring 51, the air flowing through ports 59 into chamber 58 will cause diaphragm 55 to flex and thereby move valve 47 transversely of passage 28 so as to move port 52 partially out of register with passage 28 and bring the radially disposed end of port 53 into communication with the end of passage 28 which is in constant communication with the tire. This will allow the excess pressure to be relieved by discharging the air through port 53 out into the atmosphere until the pressure is reduced to a degree slightly less than that exerted by spring 51. The degree of pressure required to operate slide valve 47 may be controlled by screwing cap-nut 50 lengthwise of the end of valve 47 so as to either increase the compression of spring 51 or decrease the same as desired.

The invention as disclosed in Fig. 9 comprises an outer shell or casing 61, provided with an inner concentrically arranged wall 62, shown made integral with the outer shell or casing so as to provide an elongated encircling chamber between the two walls, having communication at one end by means of a suitable spring-controlled valve 63, with the compression cylinder 64 arranged within inner wall or shell 62 at one end thereof. The cylinder 64 is provided with a piston or plunger 65 which is reciprocatingly mounted therein and in air-tight relation therewith. The opposite end of the rod of piston 65 is provided with a head 66, shown as preferably of greater diameter than the diameter of piston 65; the piston-head 66 being adapted to have intimate and substantially air-tight sliding relation with the inner wall 62. The cylinder 64, as clearly shown in the drawing, is of smaller diameter than the diameter of the chamber formed within inner wall 62, thus permitting a recess or pocket to be formed to receive the end of a compression spring 67, the other end whereof bears against the head 66 and normally maintains the piston or plunger in the withdrawn position illustrated in the figure. The ends of the outer and inner shells or casings 61 and 62, as well as the end of cylinder 64, are preferably shown integral and provided with an opening adapted to receive an inlet tube or conduit 68, shown disposed in the angular manner, to permit the ready attachment of a suitable force pump, or other means, whereby air may be forced into the device and therefore also into the pneumatic tire. The tube 68 is shown screwed into the opening in the outer shell and an air-tight connection formed in a suitable manner; the outer end of the tube being provided with a suitable valve whereby communication with the atmosphere may be effected under certain conditions which will obtain in the operation of the device.

The opposite end of the device, as illustrated in Fig. 9, to wit the lower end, is provided with the end of a connecting stem 21, which is intended to provide communication with the inlet tube or stem of the tire, and therefore with the inner or air-casing of the tire.

In order that the valves in the inner wall 62 may be put into place and made accessible, I show the outer wall 61 provided with removable plugs 70 and 71 at points in alinement with the points where the valves in the inner wall or shell 62 are to be located.

The valve 63 at the upper end of the device is held on its seat by the action of a suitable spring so as to prevent egress of air from the chamber intermediate walls 61 and 62, and yet permit air in cylinder 64 to be admitted into said intermediate chamber. The lower end of the intermediate chamber is provided with a valve 72, located in the inner wall or shell 62, and normally held on its seat by means of a suitable spring. The valve 72 is adapted to permit the air in the chamber, intermediate of walls 61 and 62, to flow into the end of the device which communicates with the stem-portion 21, when the air pressure in said chamber exceeds the per unit of area pressure on the opposite side of valve 72; to wit within the portion of the device beneath head 66.

The tire may be initially inflated to the desired degree of pressure by means of a pump, or other suitable device, connected with the stem 68. The air under pressure forces the valve at the end of the stem 68 open and enters cylinder 64; and as the pressure in the cylinder increases, it will force valve 63 off its seat, and allow the air to enter the chamber intermediate of walls or shells 61 and 62; it being understood, of course, that the piston or plunger 65 is at the limit of its outward movement, controlled by any suitable stop or lug, as at $62^a$, arranged slightly beyond the valve 72 so as not to permit the head 66 to pass below or cover the valve 72. The air in the chamber intermediate of walls or shells 61 and 62 will force valve 72 off its seat and thus permit the air to enter the tire-communicating end of the device and flow by means of stem 20 into the tire-casing.

As the tire is subjected to impacts or blows whereby the tire is compressed, the air therein will be displaced and, by means of stem-connection 21, will increase the pressure on the head 66 of piston 65. If this pressure is in excess of the predetermined pressure exerted by spring 67, and the per unit of area pressure in cylinder 64, it will cause the plunger or piston 65 to move lengthwise of the cylinder 64, namely toward the upper end thereof and thereby compress the air in the cylinder. The compression of the air in cylinder 64 will upset the substantial pneumostatic equilibrium normally existing in the encircling storage chamber between walls 61 and 62 and the cylinder 64. If this disturbance is sufficient to overcome the per unit area pressure in said storage chamber, it will force valve 63 off its seat and permit the compressed air to flow from the cylinder into said chamber intermediate of walls 61 and 62 until the pneumostatic equilibrium is substantially restored while the piston or plunger 65 is in the reciprocated or inward position which resulted in the increased pressure in cylinder 64 just referred to. As soon as the per unit area pressures on both sides of valve 63 are substantially equal, the valve will return to its seat and prevent the flow of air from the encircling chamber back into cylinder 64 when the piston or plunger 65 is returning to normal position through the action of its spring 67 and the reduction of pressure on the tire-communicating side of head 66, resulting from the return of the tire to its initially inflated or uniformly distended condition.

When the piston 65 is returned to normal position, a partial vacuum may be obtained within the cylinder, and the per unit area pressure within cylinder 64 and on the intake valve in stem 68 be reduced below atmospheric pressure, so that the valve 73 will be forced off its seat and air admitted into cylinder 64 until a pneumostatic equilibrium is substantially provided, when the valve will be returned to its seat through the action of its spring.

It is evident that with repeated operations of the piston, through successive impacts or blows applied to the tire, the chamber intermediate of walls or shells 61 and 62 will be provided with a supply of air under pressure, having no means of escape except through valve 72, so that when the pressure on the tire-communicating side of head 66 falls below the per unit area pressure within said chamber, valve 72 will be forced off its seat and the air permitted to flow into the tire by means of the communicating stem 21 until a substantial pneumostatic equilibrium is obtained, when valve 72, due to the action of its spring, will return to its seat.

In Fig. 10 I illustrate a modification which comprises an outer shell or casing 74, closed at both ends, with the one or upper end provided with an inlet stem 75 provided with the valve 73; while the opposite end is adapted to receive the connecting stem 21 whereby communication with the tire is effected. The stem 21 in this instance is shown provided with a short nozzle or boss 76, to which is secured an inflatable bag or collapsible member 77, shown in deflated condition in full lines and in inflated condition in dotted lines. The closed end of the bag is provided with a metallic shell or casing 78, located within the bag. This end of the bag is also provided with a flange 79, to which the end of a retracting spring 80 is secured; the opposite end of the spring being secured to the stem-portion 21. The spring 80 is preferably made to encircle the bag and normally tends to retract the bag to the condition illustrated in full lines.

Both ends of the inner metallic shell or casing 78 are provided with suitable spring valves 81 and 82, respectively; valve 81 being held on its seat against egress of air from shell 78, while valve 82 is held against the ingress of air into shell 78.

With the construction illustrated, as the tire is subjected to blows or impacts whereby air in the tire is displaced and pressure exerted on the closed end of the bag sufficient to overcome the retracting force of spring 80, the bag will be distended thereby toward the upper end of the outer shell or casing 74; the extent of movement being commensurate with the pressure exerted by the displaced air from the tire. When the bag is inflated or distended, the area within shell 74 will be materially reduced and the air in shell 74 consequently compressed. If the displacement is sufficient to place the air in outer shell 74 under sufficient compression to overcome the per unit area pressure within shell 78, valve 81 will be forced off its seat and air admitted to inner shell 78, until the pneumostatic equilibrium within both shells 74 and 78 are substantially restored. As the pressure within the bag 77 recedes, due to the return of the tire to normal condition, to a degree less than that exerted by the spring 80, it is evident that the spring will retract the bag toward the lower end of outer shell or casing 74 and thereby cause a partial vacuum to be formed in outer shell 74, so that the pressure in shell 74 will fall below atmospheric pressure. This will induce the inlet valve 73 to be forced off its seat and cause air to flow into outer shell or casing 74 until the per unit area pressures on both sides of the valve 73 are substantially equal, when the spring will return the valve to its seat. If the pressure on the tire-communicating side of the bag 77 falls below the pressure within inner shell or casing 78, valve 82 will be forced off its seat and air discharged from shell 78 into the bag and thence into the tire until the pneumostatic equilibriums in the tire, collapsible bag 77 and inner shell 78 have been substantially restored when the spring of valve 82 will force the latter to its seat.

In Fig. 11 I show another modification of my invention where the outer shell 83 (a portion whereof is shown broken away) is provided with an inner concentrically arranged cylindrical portion or wall 84 shown formed integral with one end thereof. The cylinder portion 84 is adapted to receive a hollow cylindrical plunger 85 which is adapted to have air-tight sliding connection with the inner walls of the cylinder-portion 84. The end of the plunger 85 within the cylindrical portion 84 is provided with a suitable spring-controlled valve 86 controlling communication between the interior of hollow plunger 85 and the cylinder 84. The valve 86 is arranged to prevent the egress of air from the hollow plunger 85. The opposite or lower end of plunger 85 is provided with an annular flange or head 87 arranged to have air-tight sliding connection with the outer shell 83. The head 87 also provides a bearing for a suitable spring 88, the opposite end whereof encircles the cylinder 84 and bears against the upper closed end of the outer shell; the spring normally tending to maintain the plunger 85 in the outward or withdrawn position illustrated in the figure.

The head 87 is provided with a suitable spring-controlled valve 89 adapted to prevent ingress of air into plunger 85. The upper end of the shell, and of the cylinder portion 84 are preferably formed integral, as shown, and there provided with an inlet stem 90 having the valve 73, whereby escape of air from the cylinder is prevented and through which the initial inflation of or introduction of air into the tire may be accomplished.

The lower end of the shell or casing 83, like the constructions previously described, is provided with a stem-portion 21 whereby communication with the tire is effected.

Initially, air is admitted through stem 90 into the cylinder 84, causing valve 86 to be moved off its seat, when plunger 85 is at the limit of its outward movement or normal position resulting from the action of the spring 88, namely in the position shown. The air will then flow into plunger 85, cause valve 89 to be moved off its seat, and flow through the stem-portion 21 into the tire.

With the construction shown and described, it is evident that when the tire is subjected to severe impacts or shocks, whereby air in the tire is displaced, the pressure on the head 87 will be increased to a degree in excess of the pressure exerted by spring 88 and the per unit area pressure on the small end of the plunger within the cylinder 84, thereby causing plunger 85 to be reciprocated or forced into cylinder 84. The inward movement of plunger 85 will compress the air intermediate of the inner end of the plunger and the inlet valve 73 to a degree sufficient to overcome the action of the spring of valve 86 as well as the pressure within the hollow plunger 85, with the result that the air will force valve 86 off its seat and be permitted to flow from cylinder 84 into plunger 85 until a pneumostatic equilibrium is restored between cylinder 84 and the interior of plunger 85, while the plunger is at the inward point of its reciprocation. When the pressure on the tire-communicating side of head 87 is reduced below the degree of pressure exerted by spring 88 and the per unit area pressure exerted in cylinder 84, the plunger 85 will return to its outward or normal position and thereby induce a partial vacuum in cylinder 84. This will cause valve 73 to be opened by the atmospheric pressure and result in an additional supply of air within the cylinder. As the pressure within plunger 85 is increased, through repeated reciprocations thereof, it is evident that the pressure within the plunger may eventually exceed the per unit area pressure exerted on the tire-communicating side of valve 89, with the result that valve 89 will be forced off its seat and the air be discharged from plunger 85 into the tire-communicating side of the device until a pneumostatic equilibrium throughout the tire and adjacent end of the device has been restored, when the valve 89 will return to its seat through the action of its spring.

In Figs. 9 to 11, inclusive, I show a modified form of the pressure or pneumostatically controlled valve 47$^a$. In this construction the valve 47$^a$ is preferably made of a diameter less than the diameter of the passage 28 through the stem 21, so that communication at all times between the device and the tire may exist. The slide-valve 47$^a$ is provided with the longitudinally disposed port 53 extending through to the exterior of the member, while the inner end is angularly disposed and preferably made in the nature of an elongated slot 53$^a$, so that slight movement of the valve will bring the radially disposed end 53$^a$ into communication with the passage 28 and permit air to escape from the tire and the device; the amount of air permitted to escape being commensurate with the degree of pressure exerted on the diaphragm 55$^a$ connected to the stem 91 secured to the end of the valve member 47ᵃ in any suitable manner.

As is apparent from the constructions shown and described, means are provided which will be actuated through the intensification of pressure in the tire due to impacts or blows applied to the tire, whereby quantities of air are not only compressed for ultimate injection into the tire, but also a compensating or excessive pressure-receiving receptacle is obtained, into which the air may discharge to relieve the tire of excessive strains and subsequently be returned to the tire.

With my invention, the increased pressures obtained in a pneumatic tire, when subjected to sudden strains or impacts resulting from jolts, turns or skidding, is utilized to automatically compress small quantities of air and cause the same to be introduced into the pneumatic tube of the tire to compensate for the gradual reduction of pressure in the tire due to slow leakage of air from the tire.

In practice, the tension of or pressure exerted by the spring on the plunger, as for example spring 88 in Fig. 11, preferably should substantially equal the normal pressure exerted on the opposite side of the plunger 85, to wit on head 87, and existing within the tire when the latter is inflated to a predetermined degree, so that indentations in the tire or restrictions of the internal area, resulting from blows or jars, will result in a pressure being exerted on the plunger 85 in excess of the pressure of the spring 88, causing the plunger to be actuated and thereby effect a compression of predetermined quantities of air within the device.

I have shown and described what I believe to be the simplest embodiments of my invention, but modifications may be made in certain respects without, however, departing from the spirit of my invention.

What I claim is:—

1. Means of the class described, comprising an elongated hollow member arranged in communication with the interior of a pneumatic tire so as to receive air dispelled therefrom by impacts imparted thereto, a plurality of telescopically arranged hollow plungers movable lengthwise of said member and adapted to compress the air intermediate of adjacent ends of the plungers and the end of the member and adjacent plunger, said plungers being provided with valved ports whereby the various portions of compressed air may successively discharge from the closed end of said member and intermediate plungers into the plunger farthest removed from said end, said last mentioned plunger being adapted to store the compressed air and discharge the same into the tire when the per unit area pressure in the latter is below the per unit area pressure in said plunger.

2. Means of the class described, comprising an elongated hollow member arranged in communication at one end with the interior of a pneumatic tire to receive air dispelled therefrom, a plurality of telescopically arranged hollow plungers having air-tight sliding connection with each other and with said member so as to compress the respective portions of air intermediate of adjacent ends of the plungers and closed end of said member, said plungers having a yielding resistance substantially equal to the pressure normally exerted by the air in the tire, the ends of the plungers being provided with valved ports whereby the respective portions of compressed air are successively discharged from the closed end of said member through the intermediate plungers to the plunger farthest removed from said closed end, said last mentioned plunger being adapted to store the compressed air and discharge the same into the tire when the per unit area pressure in the latter is below the per unit area pressure in said plunger.

3. Means of the class described, comprising an elongated hollow member, one end whereof has communication with the interior of a pneumatic tire while the other end has valvular communication with the atmosphere, a hollow closed-ended plunger slidably mounted in said member intermediate of the points of communication with the tire and atmosphere, the opposite ends of the plunger being provided with valved ports, one of said ports being arranged to admit air into the plunger from the atmosphere communicating-end of said member while the other port is arranged to discharge the air from the plunger into the tire-communicating end of said member when the per unit area pressure in said end of the member is below the per unit area pressure in said plunger, said plunger being adapted to be actuated through impulses imparted thereto by air discharged from the tire, and means whereby the plunger is yieldingly maintained against the action of the air in the tire until the pressure of the air forced from the tire exceeds the normal resistance of said means.

4. Means of the class described, comprising an outer member or shell arranged at one end in communication with the interior of a pneumatic tire to receive air therefrom and provided at its opposite end with a valve-controlled inlet leading to the atmosphere, means reciprocatingly mounted in said member arranged to compress air in the valved controlled inlet end of said means through the reciprocations induced by the air dispelled into the member from the tire, means whereby said reciprocating means is yieldingly maintained against the action of the air in the tire until the pressure of the air forced from the tire exceeds the normal resistance of said means, and an air storage chamber arranged to receive the compressed air from the inlet end of said member, said chamber being provided with a valve-controlled port whereby communication may be established with the tire-communicating end of said member or shell to effect a pneumostatic equilibrium on opposite sides of the valve-controlled port.

ALONZO C. TENNEY.

Witnesses:
F. A. FLORELL,
GEORGE HEIDMAN.